United States Patent
Lopez

(10) Patent No.: US 10,137,865 B1
(45) Date of Patent: *Nov. 27, 2018

(54) HEAT DISTRIBUTION SYSTEM

(71) Applicant: Raymond Lopez, Middle Village, NY (US)

(72) Inventor: Raymond Lopez, Middle Village, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,666

(22) Filed: Feb. 1, 2018

Related U.S. Application Data

(63) Continuation of application No. 14/993,441, filed on Jan. 12, 2016, now Pat. No. 9,908,514.

(60) Provisional application No. 62/125,021, filed on Jan. 12, 2015.

(51) Int. Cl.
*B60S 1/68* (2006.01)

(52) U.S. Cl.
CPC ...................................... *B60S 1/68* (2013.01)

(58) Field of Classification Search
CPC .... B60S 1/54; B60S 1/68; B60S 1/685; B60S 3/04; E01H 5/106; B60H 1/00271; B60B 39/026; B60B 39/027; B60B 39/028
See application file for complete search history.

(56) References Cited

U.S. PATENT DOCUMENTS

| | | | | | |
|---|---|---|---|---|---|
| 2,325,901 | A | * | 8/1943 | Atkinson | B60H 1/00271 126/271.1 |
| 3,289,668 | A | * | 12/1966 | Drucker | B60B 39/023 126/271.1 |
| 4,203,423 | A | * | 5/1980 | Ricci | B60B 39/023 126/271.1 |
| 4,324,307 | A | * | 4/1982 | Schittino | B60B 39/028 126/271.1 |
| 4,848,510 | A | * | 7/1989 | Ahmed | B60B 39/028 180/309 |
| 6,848,726 | B1 | * | 2/2005 | Horsham | B60R 16/0237 237/12.3 B |
| 9,096,983 | B1 | * | 8/2015 | Mejia | B05B 12/12 |
| 9,283,816 | B1 | * | 3/2016 | Laurita | B60C 19/00 |

\* cited by examiner

*Primary Examiner* — Tho V Duong
(74) *Attorney, Agent, or Firm* — Plager Schack LLP; Mark H. Plager; Michael J. O'Brien

(57) ABSTRACT

A heat distribution system is configured to melt snow that is proximate wheels on an automobile. The heat distribution system has a heat exchanger attached to the automobile and configured to heat air flowing past the heat exchanger creating hot air. A fan is proximate the heat exchanger and configured to move the hot air. A manifold is proximate the heat exchanger and configured to receive the hot air from the fan. A first duct, a second duct, and a transverse duct are joined to the manifold. A third duct and a fourth duct are attached to the transverse duct. Each duct terminates in a nozzle. The hot air is pushed through the manifold and out the nozzles melting the snow.

7 Claims, 2 Drawing Sheets

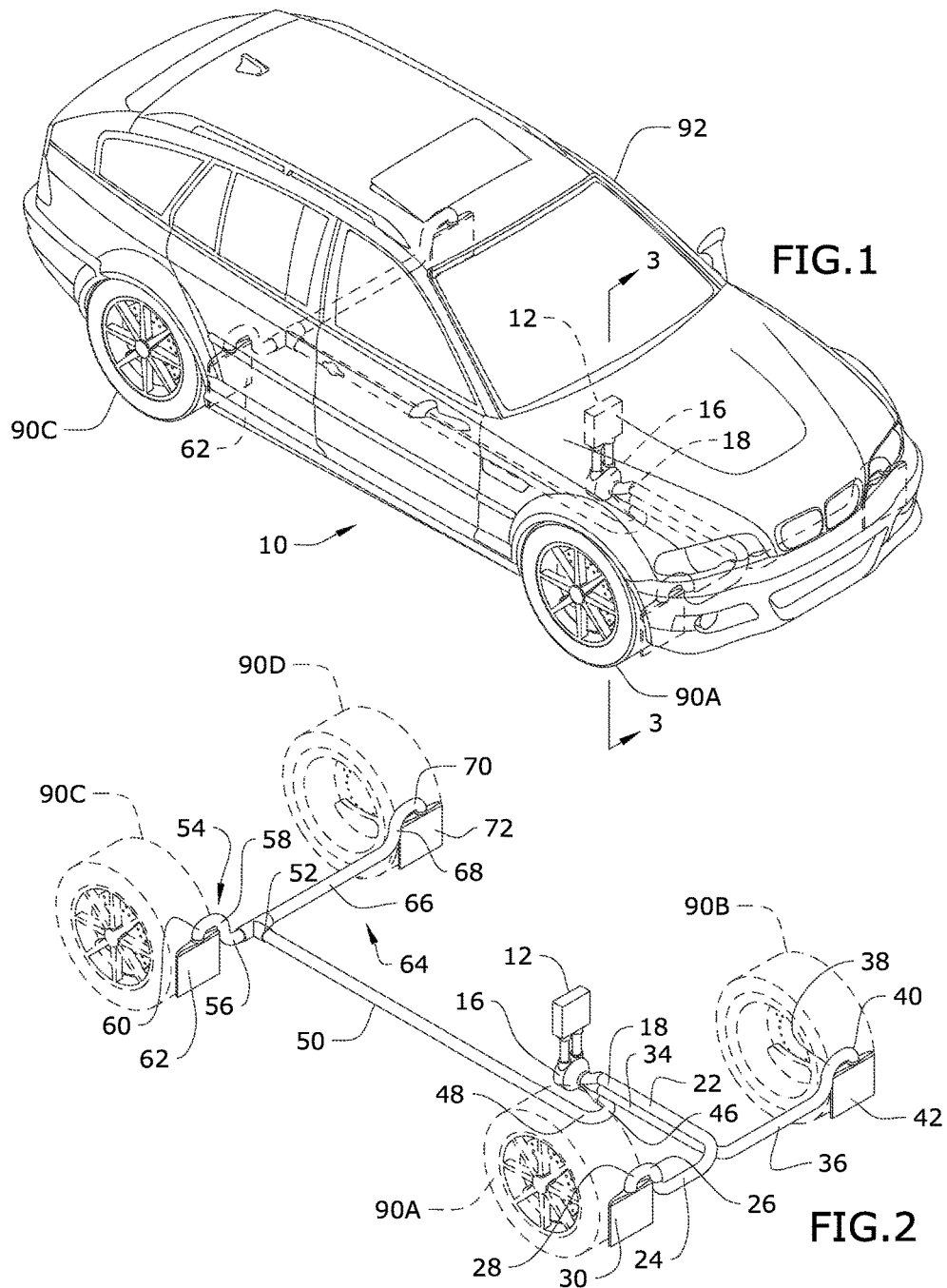

HEAT DISTRIBUTION SYSTEM

RELATED APPLICATION

This application is a continuation of non-provisional patent application U.S. Ser. No. 14/993,441 filed on Jan. 12, 2016, which, in turn, claims priority to provisional patent application U.S. Ser. No. 62/125,021 filed on Jan. 12, 2015, the entire contents of both applications is herein incorporated by reference.

BACKGROUND

The embodiments herein relate generally to devices that melt snow. Prior to embodiments, getting out of a snow covered parking lot required a shovel and a lot of work. Embodiments of the disclosed invention solve that problem.

SUMMARY

A heat distribution system is configured to melt snow proximate wheels on an automobile. The heat distribution system has a heat exchanger attached to the automobile and configured to heat air flowing past the heat exchanger creating hot air. A fan is proximate the heat exchanger, and configured to move the hot air. A manifold is proximate the heat exchanger and configured to receive the hot air from the fan. A first duct, a second duct, and a transverse duct are joined to the manifold. A third duct and a fourth duct are attached to the transverse duct. A first duct nozzle is attached to an end of the first duct proximate a first wheel on the automobile. A second duct nozzle is attached to an end of the second duct proximate a second wheel on the automobile. A third duct nozzle is attached to an end of the third duct proximate a third wheel on the automobile. A fourth duct nozzle is attached to an end of the fourth duct proximate a fourth wheel on the automobile. The hot air is pushed through the manifold and out the first duct nozzle, the second duct nozzle the third duct nozzle and the fourth duct nozzle melting the snow proximate the first wheel, the second wheel, the third wheel and the fourth wheel.

In some embodiments, the first duct can further comprise a first duct forward portion directly connected to a first duct outward portion. A first duct upward portion can be directly connected to the first duct outward portion. A first duct downward portion can be directly connected to the first duct upward portion. The first duct downward portion can be directly connected to the first duct nozzle.

In some embodiments, the second duct can further comprise a second duct forward portion directly connected to a second duct outward portion. A second duct upward portion can be directly connected to the second duct outward portion. A second duct downward portion can be directly connected to the second duct upward portion. The second duct downward portion can be directly connected to the second duct nozzle.

In some embodiments, the transverse duct can further comprise a transverse duct forward portion directly connected to a transverse duct rounded portion. A transverse duct transition portion cane be directly connected to the transverse duct rounded portion. A transverse duct tee section can be directly connected to the transverse duct transition portion. The transverse duct tee section can be directly connected to the third duct and the fourth duct.

In some embodiments, the third duct can further comprise a third duct outward portion, directly attached to the transverse duct tee section. A third duct upward portion can be directly attached to the third duct outward portion. A third duct downward portion can be directly attached to the third duct upward portion. The third duct downward portion can terminate into the third duct nozzle.

In some embodiments, the fourth duct can further comprise a fourth duct outward portion, directly attached to the transverse duct tee section. A fourth duct upward portion can be directly attached to the fourth duct outward portion. A fourth duct downward portion can be directly attached to the fourth duct upward portion. The fourth duct downward portion can terminate into the fourth duct nozzle.

In some embodiments, the manifold can further comprise a first tamper, adapted to alter the flow of the hot air into the first duct. A second tamper can be adapted to alter the flow of the hot air into the second duct. A third tamper can be adapted to alter the flow of the hot air into the transverse duct.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of an embodiment of the invention shown installed.

FIG. 2 is a perspective view of an embodiment of the invention omitting vehicle body.

DETAILED DESCRIPTION OF CERTAIN EMBODIMENTS

Figure 3:
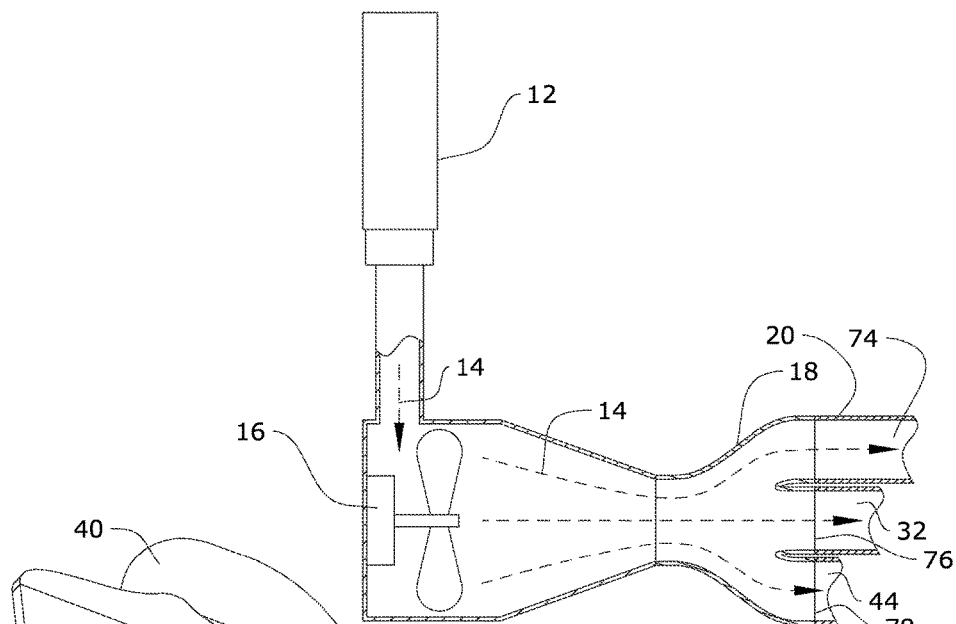
FIG. 3 is a section detail view of an embodiment of the invention along line 3-3 in FIG. 2.
Figure 4:
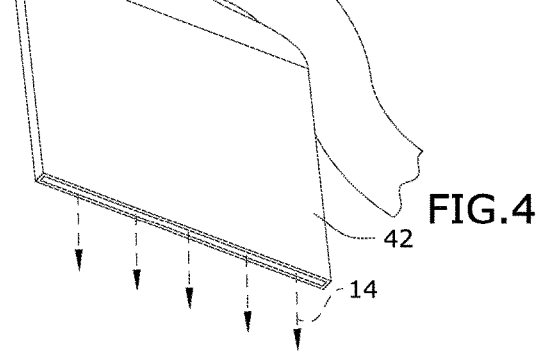
FIG. 4 is a bottom detail perspective view of an embodiment of the invention demonstrating air heat.
Figure 5:
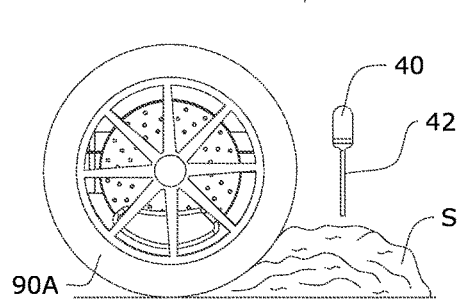
FIG. 5 is a side detail view of an embodiment of the invention show inactive.
Figure 6:
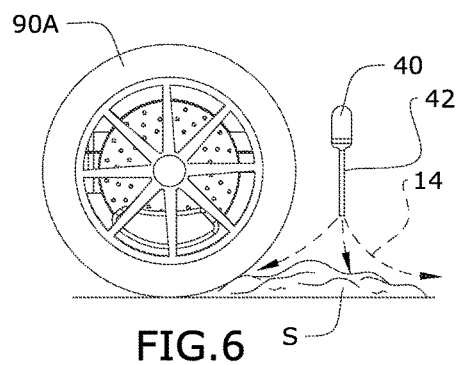
FIG. 6 is a side detail view of an embodiment of the invention shown active.

By way of example, and referring to FIG. 1, one embodiment of heat distribution system 10 is adapted to melt snow S proximate wheels 90 attached to automobile 92. Distribution system 10 comprises heat exchanger 12 which is attached to automobile 92. In some embodiments, heat exchanger 12 can be a heater core that receives heat from an engine in automobile 42. Heat exchanger 12 pushes air 14 into fan 16. Fan 16 pushes heated air 14 into manifold 18. Manifold 18 directs heated air into first duct 20, second duct 32, and transverse duct 44.

First duct 20 further comprises first duct forward portion 22 which is joined to first duct outward portion 24. First duct outward portion 24 is connected to first duct upward portion 26. First duct upward portion 26 is connected to first duct downward portion 28. First duct downward portion 28 terminates into first duct nozzle 30. First duct nozzle 30 is located in front of first wheel 90A. First duct nozzle 30 has a smaller diameter than first duct downward portion 28 which increases the velocity of heated air 14 into snow S.

Second duct 32 further comprises second duct forward portion 34 which is joined to second duct outward portion 36 and is parallel to first duct forward portion 22. Second duct outward portion 36 is connected to second duct upward portion 38. Second duct upward portion 38 is connected to second duct downward portion 40. Second duct downward portion 40 terminates into second duct nozzle 42. Second duct nozzle 42 is located in front of second wheel 90B.

Second duct nozzle 42 has a smaller diameter than second duct downward portion 40 which increases the velocity of heated air 14 into snow S.

Transverse duct 44 further comprises transverse duct forward portion 46 joined to transverse duct rounded portion 48. Transverse duct rounded portion 48 is joined to transverse duct transition portion 50. Transverse duct transition portion 50 is connected to transverse duct tee section 52. Transverse duct tee section 52 is connected to third duct 54 and fourth duct 64.

Third duct 54 further comprises third duct outward portion 56. Third duct outward portion 56 is connected to third duct upward portion 58. Third duct upward portion 58 is connected to third duct downward portion 60. Third duct downward portion 60 terminates into third duct nozzle 62. Third duct nozzle 62 is located in front of third wheel 90C. Third duct nozzle 62 has a smaller diameter than third duct downward portion 60 which increases the velocity of heated air 14 into snow S.

Fourth duct 64 further comprise fourth duct outward portion 66. Fourth duct outward portion 66 is connected to fourth duct upward portion 68. Fourth duct upward portion 68 is connected to fourth duct downward portion 70. Fourth duct downward portion 70 terminates into fourth duct nozzle 72. Fourth duct nozzle 72 is located in front of fourth wheel 90D. Fourth duct nozzle 72 has a smaller diameter than fourth duct downward portion 70 which increases the velocity of heated air 14 into snow S.

In some embodiments, manifold 18 can throttle the flow or of hot air 14 through first duct 20 with first tamper 74. Manifold 18 can throttle the flow or of hot air 14 through second duct 32 with second tamper 76. Manifold 18 can throttle the flow or of hot air 14 through transverse duct 44 with third tamper 78.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, å6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A heat distribution system configured to melt snow proximate wheels on an automobile; the heat distribution system comprising:
    a heat exchanger attached to the automobile and configured to heat air flowing past the heat exchanger creating hot air;
    a fan, proximate the heat exchanger, and configured to move the hot air;
    a manifold, proximate the heat exchanger and configured to receive the hot air from the fan;
        a first duct, a second duct, and a transverse duct, joined to the manifold; wherein the first duct further comprises:
            a first duct forward portion, directly connected to a first duct outward portion;
            a first duct upward portion, directly connected to the first duct outward portion;
            a first duct downward portion, directly connected to the first duct upward portion;
    wherein the first duct downward portion is directly connected to the first duct nozzle;
    a first duct nozzle, attached to an end of the first duct proximate a first wheel on the automobile;
    a second duct nozzle, attached to an end of the second duct proximate a second wheel on the automobile;
    a third duct, attached to the transverse duct;
    a third duct nozzle, attached to an end of the third duct proximate a third wheel on the automobile;
    wherein the hot air is pushed through the manifold and out the first duct nozzle, the second duct nozzle, and the third duct nozzle melting the snow proximate the first wheel, the second wheel, and the third wheel.

2. The heat distribution system, of claim 1, further comprising:
    a fourth duct attached to the transverse duct;
    a fourth duct nozzle, attached to an end of the fourth duct proximate a fourth wheel on the automobile;
    wherein the hot air pushed through the fourth duct nozzle melts the snow proximate the fourth wheel.

3. The heat system distribution of claim 2, wherein the second duct further comprises:
    a second duct forward portion, directly connected to a second duct outward portion;
    a second duct upward portion, directly connected to the second duct outward portion;
    a second duct downward portion, directly connected to the second duct upward portion;
    wherein the second duct downward portion is directly connected to the second duct nozzle.

4. The heat system distribution of claim 3, wherein the transverse duct further comprises:
    a transverse duct forward portion directly connected to a transverse duct rounded portion;
    a transverse duct transition portion directly connected to the transverse duct rounded portion;
    a transverse duct tee section directly connected to the transverse duct transition portion;

wherein the transverse duct tee section is directly connected to the third duct and the fourth duct.

5. The heat system distribution of claim 4, wherein the third duct further comprises:
- a third duct outward portion, directly attached to the transverse duct tee section;
- a third duct upward portion, directly attached to the third duct outward portion;
- a third duct downward portion, directly attached to the third duct upward portion;
- wherein the third duct downward portion terminates into the third duct nozzle.

6. The heat system distribution of claim 5, wherein the fourth duct further comprises:
- a fourth duct outward portion, directly attached to the transverse duct tee section;
- a fourth duct upward portion, directly attached to the fourth duct outward portion;
- a fourth duct downward portion, directly attached to the fourth duct upward portion;
- wherein the fourth duct downward portion terminates into the fourth duct nozzle.

7. The heat system distribution of claim 6, wherein the manifold further comprises:
- a first tamper, adapted to alter the flow of the hot air into the first duct;
- a second tamper, adapted to alter the flow of the hot air into the second duct; and
- a third tamper, adapted to alter the flow of the hot air into the transverse duct.

* * * * *